H. BERGET.
AUTOMATIC VEHICLE BRAKE.
APPLICATION FILED SEPT. 12, 1916.
1,221,273.
Patented Apr. 3, 1917.
2 SHEETS—SHEET 2.
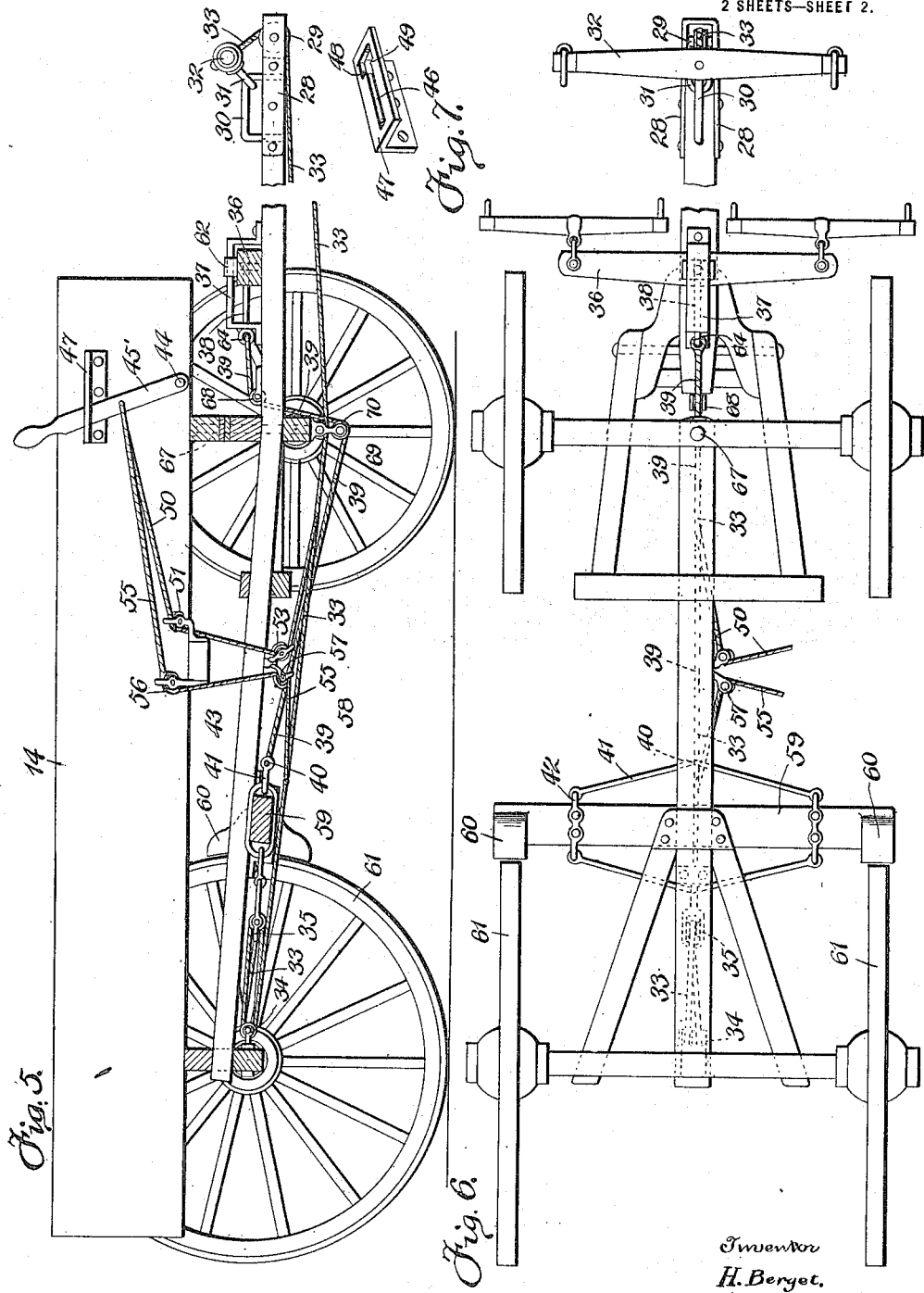
Inventor
H. Berget.
By
[signature], Attorneys

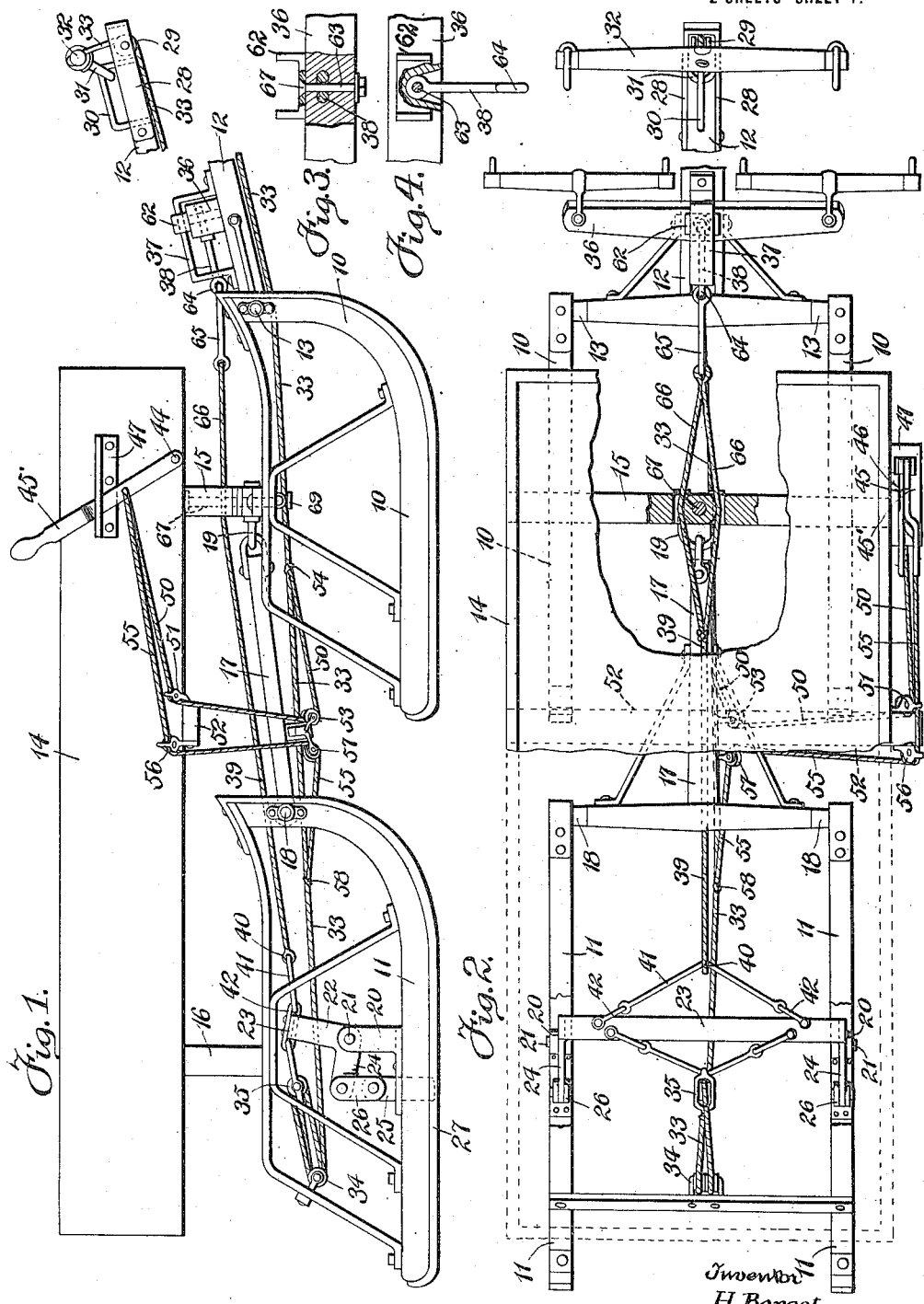

UNITED STATES PATENT OFFICE.

HERMAN BERGET, OF KEENE, NORTH DAKOTA.

AUTOMATIC VEHICLE-BRAKE.

1,221,273.  Specification of Letters Patent.  Patented Apr. 3, 1917.

Application filed September 12, 1916. Serial No. 119,723.

*To all whom it may concern:*

Be it known that I, HERMAN BERGET, a citizen of the United States, residing at Keene, in the county of McKenzie and State of North Dakota, have invented certain new and useful Improvements in Automatic Vehicle-Brakes, of which the following is a specification.

This invention relates to improvements in brakes for vehicles which is partially automatic, or so arranged that the forward pull of the team holds the brake in inoperative or released position, and adapted to be "set," or disposed in operative position, by the action of the team in holding back when the vehicle is moving down grade, and has for one of its objects to simplify and improve the construction and increase the efficiency and utility of devices of this character.

Another object of the invention is to provide a simply constructed device which may be applied without material structural change to the runners of a sleigh or the wheels of a wagon or other like vehicle.

Another object of the invention is to provide a device of this character which may be manually actuated from the seat of the vehicle independently of the automatic operation by the team.

With these and other objects in view, the invention consists in certain novel features of construction, as hereinafter shown and described and then specifically pointed out in the claims; and in the drawings illustrative of the preferred embodiment of the invention—

Figure 1 is a side elevation of a conventional sleigh with the improvement applied;

Fig. 2 is a plan view with portions in section and with the portion of the box or body which is located above the rear runners broken away;

Figs. 3 and 4 are detail views, enlarged illustrating the construction of a portion of the coupling between the double-tree and the hounds of the tongue;

Fig. 5 is a side elevation, partly in section, of a conventional wagon with the brake mechanism applied;

Fig. 6 is a plan view of the running gear of the wagon shown in Fig. 3;

Fig. 7 is a detached perspective view of the lever locking device.

Corresponding and like parts are referred to in the following description and indicated in all the views of the drawings by the same reference characters.

The improved device may be applied without material structural change to sleighs and wagons of various forms, and it is not desired to limit the invention in this matter in any respect, but for the purpose of illustration the improved device is shown in Figs. 1 and 2 applied to a conventional sleigh and in Figs. 5 and 6 applied to a conventional wagon. In Figs. 1 and 2 the forward runners are represented conventionally at 10 and the rear runners at 11. The draft tongue is represented conventionally at 12 and mounted to swing at 13 between the forward runners 10. The tongue is shown foreshortened to economize space. The body of the sleigh is represented conventionally at 14 and is mounted in the usual manner upon the bolsters 15—16. The rear runners 11 are connected to the forward runners by the usual reach member 17 which is pivoted at one end at 18 to the rear runners and connected by the usual link device 19 to the forward runners, preferably to the bolster 15.

When applied to a sleigh, brackets 20 are connected to the rear runners, and pivoted at 21 in these brackets are the downwardly depending elements 22 of a brake beam or bar 23, the latter extending thus from side to side of the runners. Directed rearwardly from each of the pivoted portions 22 of the brake bar is an arm 24. Arranged to slide vertically through suitable apertures in the runners 11 are shoe devices 25, the shoe devices being coupled by links 26 respectively to the arms 24. By this arrangement it will be obvious that when the member 23 is moved to its forward position the shoe devices 25 will be elevated with their lower ends above the lower face of the shoe portions 27 of the runner members 11, as indicated in dotted lines in Fig. 1, and when the member 23 is moved to its rear position the shoe devices 25 will be projected below the lower line of the shoes 27 of the runners and engage the snow or ice and produce a braking action upon the runners.

The forward end of the tongue 12 is provided with a U-shaped strap 28 which extends beyond the forward end of the tongue and is provided with a pivoted guide pulley 29. Projecting above the upper line of the tongue 12 near its forward end is a relatively long link 30, and slidably engaging this link is an eye 31 connected to the neckyoke 32 of the harness. A cable device 33 is connected at one end to the neckyoke 32 and extends thence around the guide pulley 29 and beneath the lower portion of the tongue and beneath the forward bolster 15 and thence to a power increasing device preferably formed of cable guide pulleys 34 attached to the frame-work of the runner member 11 and a guide pulley 35 attached to the member 23, the cable 33 being woven backwardly and forwardly over the guide pulleys and thus producing a power increasing connection between the member 32 and the member 23. By this arrangement it will be obvious that when a backward pull is imparted to the neckyoke, a powerful pull will be exerted upon the member 23 to apply the brake shoes 25, the movement of the neckyoke being guided by the coaction of the relatively long link 30 and the eye 31.

Suitable guide pulleys indicated at 69, are located beneath the forward bolster 15 in vertical alinement with the king pin 67, so that the cable will be retained centrally of the vehicle when turning or moving on curved lines.

The double tree portion of the draft appliance is indicated conventionally at 36 and operates beneath a guide device 37 on the tongue 12 and is thus movable bodily rearwardly to a limited extent. A U-shaped member 62 is pivoted at 63 to the double tree 36 and bears by its sides upon opposite sides of the guide keeper 37, as shown in Figs. 1, 2, 3 and 4, and thus prevents lateral displacement of the double tree while, at the same time permitting the requisite swivel action. A pull rod 38 enters a cavity in the rear of the double tree and terminates in a forward eye through which the pivot pin 63 of the double tree and member 62 extend thus leaving the swingle tree free to swing upon its pivot under the "horse motion". The rod 38 extends rearwardly through the rear portion of the member 37 and terminates in a rear eye 64 which also serves as a stop to limit the forward movement of the double tree and prevents it from contacting with the forward portion of the member 37, but provides means whereby the forward pull is borne by the rear part of the member 37. Connected to the eye 64 of the rod 38 is a short pull rod 65 and connected to the latter is a pull member 66 divided into two parts and passed through the forward bolster 15 at opposite sides of the king pin 67. At its inner terminal the member 66 is connected to a pull cable 39 which is connected at 40 to a link or bail device 41, the latter being in turn coupled at 42 to the member 23.

By the arrangement of parts shown it will be obvious that when the draft is applied to the double tree 37 in the ordinary operation of the vehicle it will be held in its forward position and the pull cables 66 and 39 utilized to hold the member 23 and its attached brake shoe members 25 in inoperative or elevated position, as shown in Fig. 1, but when the team is holding back, for instance when the vehicle is moving down grade, the link 30 will move forwardly by its eye 31, thus tightening the cable 23 and applying the brake, as before described.

The force of the backward pull of the team upon the neck-yoke is necessarily relatively slight, hence the necessity for employing the power multiplying feature previously described, so that the relatively slight backward force of the team may be sufficient to apply the brake.

Pivoted at 44 to the body 14 are brake applying levers 45—45'; the levers operating side by side and extending through a relatively long slot 46 in a plate 47 attached to the side of the body 1. At its forward end the slot 46 is enlarged laterally to form stop shoulders 48—49 against which the levers 45—45' are adapted to engage when moved into their forward position. By this arrangement the lever 45 is engaged against the shoulder 48 when moved into its forward position, while the lever 45' is engaged with the shoulder 49 when moved forwardly. The levers thus work independently and may be caused to spring into engagement with the holding shoulders when required, and thus lock the levers in their forward position. Connected to the lever 45 is a pull cable 50 which is carried over a guide pulley 51 attached to a transverse beam 52 which is supported beneath the body 14 and extends beyond one side of the same, as shown in Fig. 2, and thence around a guide pulley 53 attached to the underface of the reach 17 and thence connected at 54 to the pull cable 33 forwardly of the guide pulley 53. Connected to the lever 45' is a pull cable 55 which extends thence around a guide pulley 56 on the beam 52 and thence around a guide pulley 57 attached to the reach 17 and thence connected at 58 to the pull cable 33 rearwardly of the guide pulley 57. By this arrangement it will be obvious that when the lever 45' is moved into its forward position a pull force will be applied to the pull cable 33 to set the brake, and when the lever 45 is moved into its forward position the brake will be released. The levers may thus be employed to manually apply or release the brake independently of the operation of the neck-yoke 32 and the double tree 36.

When applied to a wheeled vehicle the mechanism shown in Figs. 5 and 6 will be employed, and including a conventional brake beam 59 having brake shoes 60 to engage the rear wheels 61 of the vehicle instead of the member 23 and its attachments, but otherwise the parts are substantially the same as those employed in connection with a sleigh, as shown in Figs. 1 and 2. When employed upon a vehicle as shown in Figs. 5 and 6 the pull cable 39 is connected directly to the combined stop and eye 64 of the rod 38 and is carried thence over a guide pulley 68 attached to the tongue hounds and thence downwardly and over a guide pulley 70, in vertical alinement with the guide pulley 69 and thence to the brake beam 59. Other guide pulleys may be located wherever necessary to prevent undue abrasion of the guide cables.

The improved device is simple in construction, can be applied without material structural change to vehicles of various forms, either sleighs or wagons, and enables the brake to be automatically applied when the team is moving down grade, and will be automatically released when the team is moving on level ground or upgrade.

Having thus described the invention, what is claimed as new is:

1. The combination with a vehicle including the running gear and draft tongue, of brake devices coacting with said running gear, a neck yoke movable relatively to said draft tongue, a guide device rigidly connected to said draft tongue and including a portion spaced therefrom, a draft appliance movable within said guide device, a stop member connected to said draft appliance and slidably engaging the spaced portion of the guide device, connecting means coupled respectively to said brake device and to said neck yoke, and connecting means coupled respectively to said draft appliance and to said brake device.

2. The combination with a vehicle including the running gear and draft tongue, of brake devices coacting with said running gear, a neck yoke movable relatively to said draft tongue, a guide device carried by said draft tongue, a draft appliance movable within said guide device, a stop member pivotally connected to said draft appliance and including projections slidably engaging said guide device, a pulling member slidable through said guide device and including an eye engaging the pivot of said stop member, a pulling member connected respectively to said neck yoke and to said brake device and operating to apply the brake when the neck yoke is moved rearwardly, and another pulling member connected respectively to said sliding pulling member and to said brake device and operating to release the brake when the draft device is moved forwardly.

3. The combination with a vehicle including the running gear and draft tongue, of a brake device coacting with said running gear, a draft appliance movable relatively to said draft tongue, a neck yoke movable relatively to said draft tongue, connecting means coupled respectively to said brake device and to said neck yoke, connecting means coupled respectively to said draft appliance and to said brake device, coacting levers pivotally connected relatively to said running gear, connecting means between one of said levers and the connecting means between the brake device and the neck yoke, and operating to apply the brake device, and connecting means between the other of said levers and the connecting means between the brake device and the neck yoke and operating to release the brake device.

4. The combination with a vehicle including the running gear and draft tongue, of brake devices coacting with said running gear, a draft appliance movable relatively to said draft tongue, a neck yoke movable relatively to said draft tongue, pulling means coupled respectively to said brake devices and to said neck yoke, pulling means coupled respectively to said draft appliance and to said brake device, coacting levers pivoted relatively to said running gear, a guide member associated with said levers and including lateral offsets with which said levers engage when in one position, connecting means coupled respectively to said brake pulling means and to one of said levers, and connecting means between said brake pulling means and the other of said levers.

5. The combination with a vehicle including the running gear and a draft tongue, of brake devices coacting with said running gear, a draft appliance movable relatively to said draft tongue, a neckyoke movable relatively to said draft tongue, a pull member connecting said neckyoke to said brake device and operating to apply the brake when the neckyoke is moved rearwardly, guide means for said pull member in vertical alinement with the king pin of the running gear, another pull member connecting the draft appliance to the brake devices and operating to release the brake devices when the draft appliance is moved forwardly, said last mentioned pull member being divided and passing upon opposite sides of the king pin.

In testimony whereof I affix my signature.

HERMAN BERGET. [L. S.]

Copies of this patent may be obtained for five cents each, by addressing the "Commissioner of Patents, Washington, D. C."